(12) United States Patent
Shin et al.

(10) Patent No.: US 11,321,017 B2
(45) Date of Patent: May 3, 2022

(54) SYSTEMS AND METHODS FOR CONTROLLING COMPLETION RATE OF COMMANDS

(71) Applicant: SK hynix Inc., Gyeonggi-do (KR)

(72) Inventors: Seong Won Shin, San Jose, CA (US); Yi Tong, San Jose, CA (US); Jeffrey Song, San Jose, CA (US)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/915,203

(22) Filed: Jun. 29, 2020

(65) Prior Publication Data
US 2021/0405922 A1 Dec. 30, 2021

(51) Int. Cl.
*G06F 3/06* (2006.01)

(52) U.S. Cl.
CPC .......... *G06F 3/0659* (2013.01); *G06F 3/0613* (2013.01); *G06F 3/0614* (2013.01); *G06F 3/0653* (2013.01); *G06F 3/0673* (2013.01)

(58) Field of Classification Search
CPC .............................................. G06F 3/06–0689
See application file for complete search history.

(56) References Cited

U.S. PATENT DOCUMENTS

| | | | |
|---|---|---|---|
| 10,496,281 B2 | 12/2019 | Jeong et al. | |
| 2015/0195210 A1* | 7/2015 | Tsuruoka | H04L 1/188 370/235 |
| 2018/0275923 A1* | 9/2018 | Earhart | G06F 3/0653 |
| 2019/0079697 A1 | 3/2019 | Suzuki et al. | |
| 2020/0084150 A1* | 3/2020 | Burstein | H04L 47/283 |

\* cited by examiner

*Primary Examiner* — Nicholas J Simonetti
(74) *Attorney, Agent, or Firm* — IP & T Group LLP (57) ABSTRACT

A controller of a memory system controls a completion rate of commands. The controller receives, from a host, command requests to be processed on a memory device. The controller processes the command requests, determines a first number of completion notifications, which are to be transmitted to the host in a first time interval, among multiple completion notifications associated with the command requests, based on a throughput credit, a set maximum credit, and the number of the multiple completion notifications. The controller transmits, to the host, the first number of completion notifications in the first time interval, and transmits a second number of completion notifications in the second time interval.

20 Claims, 8 Drawing Sheets

SYSTEMS AND METHODS FOR CONTROLLING COMPLETION RATE OF COMMANDS

BACKGROUND

1. Field

Embodiments of the present disclosure relate to a scheme for processing commands in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). A memory system receives commands associated with a memory device from a host and process the commands on the memory device.

SUMMARY

Aspects of the present invention include a system and a method for controlling a completion notification rate of commands over time based on a throughput credit.

In one aspect, a data processing system includes a host and a memory system including a controller and a memory device. The controller receives, from the host, command requests to be processed on the memory device; processes the command requests; determines a first number of completion notifications, which are to be transmitted to the host in a first time interval, among multiple completion notifications associated with the command requests, based on a throughput credit, a set maximum credit, and the number of the multiple completion notifications; and transmits, to the host, the first number of completion notifications in the first time interval, and transmits, to the host, a second number of completion notifications among the multiple completion notifications in the second time interval subsequent to the first time interval.

In another aspect, a method operates a data processing system, which includes a host and a memory system including a controller and a memory device. The method includes: receiving, from the host, command requests to be processed on the memory device; processing the command requests; determining a first number of completion notifications, which are to be transmitted to the host in a first time interval, among multiple completion notifications associated with the command requests, based on a throughput credit, a set maximum credit, and the number of the multiple completion notifications; and transmitting, to the host, the first number of completion notifications in the first time interval, and transmitting, to the host, a second number of completion notifications among the multiple completion notifications in the second time interval subsequent to the first time interval.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Generally, performance metrics of memory systems (e.g., enterprise SSDs) include throughput in megabyte per second (MB/s) or input and output (IO) operations per second (IOPs), and latency such as average or multi-nines latency profile. Multi-nines latency profile represents the worst command completion time in such nines portion (e.g., 99%, 99.9%), which is commonly referred as quality of service (QoS) measurement.

For enterprise SSDs, it is important that throughput metrics both in MB/s and IOPs are consistently maintained over time within known bounds. In one known definition, consistency of throughput is defined as {Throughput$_{worst\ at\ N\text{-}nines}$/Throughput$_{average}$} for a fixed number of throughput measurement samples collected over time. Throughput$_{worst\ at\ N\text{-}nines}$ represents $99.9^{th}$ worst throughput value when N=3. Throughput$_{average}$ represents average of all throughput samples. 4 KB Wr QoS$_{N\text{-}nine}$ may be used to represent $99.9^{th}$ worst 4 KB block size write command latency when N=3, out of the whole 4 KB block size write command latencies. Typically, N in QoS covers one of 2, 3, 4, . . . 9.

Memory systems may include memory devices, such as NAND flash memory devices, operably coupled in parallel. Due to the parallelism architecture, command processing completions (e.g., data read or write operations associated with read or write commands) at the memory devices are usually bursty by nature. This means that significantly more commands are completed during a certain time slot than during any other time slots. In this case, performance metrics of memory systems are not consistent. Accordingly, it is desirable to provide a scheme capable of providing consistent performance metrics (i.e., throughput or latency), which control the completion notification rate of commands over time based on a throughput credit. Below, the term "CBRC" denotes credit based rate control. In accordance with embodiments, outputs of a memory system (e.g., SSD) to a host achieves a consistent throughput over time and a high degree of QoS latency, as a metric.

Figure 1:
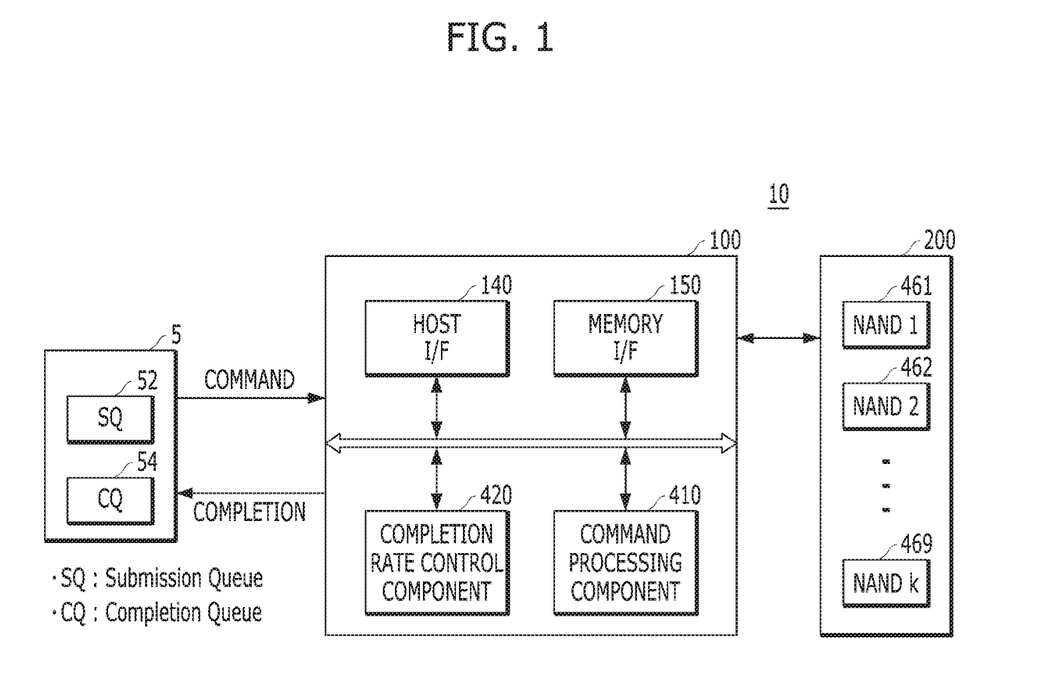
FIG. 1 is a diagram illustrating a data processing system in accordance with an embodiment of the present invention.

FIG. 1 is a diagram illustrating a data processing system in accordance with an embodiment of the present invention.

Referring to FIG. 1, the data processing system may include a host 5, a controller 100 and a memory device 200. The controller 100 and the memory device 200 may configure a memory system 10. For example, the controller 100 and the memory device 200 may include various components of the memory system 10 not shown herein. In the illustrated embodiment, the memory system 10 may be implemented with a non-volatile memory express (NVMe) SSD and the memory device 200 may be implemented with a plurality of memories in parallel, e.g., k NAND flash memories 461 to 469 in parallel. The NAND flash memories (e.g., NAND dies) 461 to 469 are coupled to the memory controller 100 through one or more channels. While the features and aspects of the invention are described below in the context of an NVMe SSD, those skilled in the art will understand that the invention is also applicable to other types of SSDs and other memory systems.

The host 5 may exchange command requests and completions with and the memory system 10 via a predefined IO command queue structure. For example, the host 5 includes a submission queue (SQ) 52 and a completion queue (CQ) 54, which are paired as IO command queues. The host 5 may include SQ and CQ pairs depending on configuration such as the number of CPU cores in the controller 100, operating system (OS) and storage (i.e., memory device) IO configurations. The submission queue 52 may store command requests associated with operations of the memory device 200, which are submitted to the memory controller 100. The completion queue 54 may receive completion notifications of command requests, i.e., items of data indicating that respective command requests have been completed, from the controller 100 and store the received completion notifications. Thus, the host 5 recognizes completion of each of the command requests as the corresponding completion data is put in the completion queue 54. In response to completion data being delivered to the completion queue 54, the host 5 puts new command(s) into the submission queue 52 to maintain a predefined number of commands for processing by the memory system 10.

The controller 100 may include a host interface (I/F) 140, a memory interface (I/F) 150, a command processing component 410 and a completion rate control component 420. These components 410, 420 may be implemented with internal components (e.g., software (SW)) of the control component 120. Alternatively, these components 410, 420 may be implemented with hardware (HW) components. Although not shown in FIG. 1, the controller 100 and the memory device 200 may include various other components of the memory system 10.

The host interface 140 may receive command requests from the host 5. For example, the command requests may be associated with operations (e.g., read, write or erase operations) on the memory device 200. The command processing component 410 may process the command requests to perform the command requests on the memory device 200. After the command requests are completed, it is necessary for the controller 100 to transmit multiple completions associated with completions of the command requests to the host 5.

Figure 2:
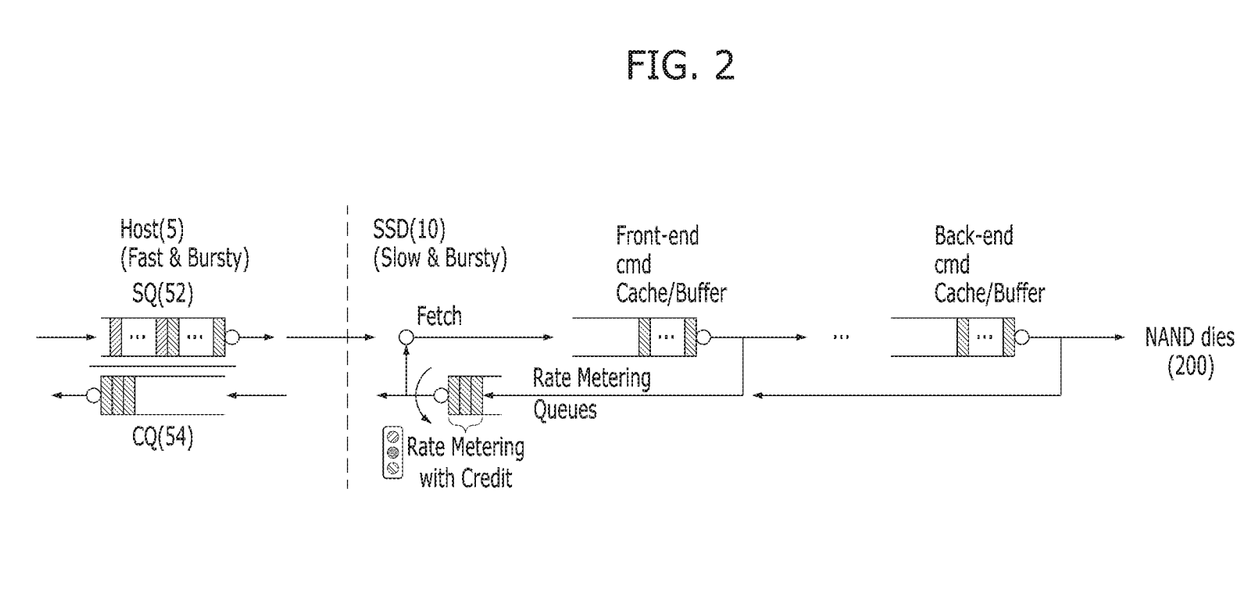
FIG. 2 illustrates an operation flow between a host and a memory system in accordance with an embodiment of the present invention.

FIG. 2 illustrates an operation flow between the host 5 and the memory system (e.g., NVMe SSD) 10 in accordance with an embodiment of the present invention.

Referring to FIG. 2, the host 5 may put up to a predefined number of commands, corresponding to queue depth of the SQ 52, in SQ 52. Upon recognizing an increase in the number of commands in the SQ 52, the SSD 10 fetches command(s) from the SQ 52 and puts the fetched command(s) into the front-end (i.e., host interface (I/F) side) command cache or buffer and/or the back-end (i.e., NAND I/F side) command queue. Depending on the characteristics of the command (e.g., write commands), the command completion to the host 5 can be made before the NAND I/F side processing is done for the NAND dies 200.

Typically, the processing time of the host 5 is faster than that of the SSD 10 and the occupancy level of the SQ 52 should be maintained at its maximum level, which is defined by the queue depth. However, the SQ occupancy level may go down unexpectedly due to the SSD's bursty internal completions (i.e., execution of the commands), as show in (620A) of FIG. 3. For example, when a burst operation such as a group of write commands for multiple pages of a die is completed, the SQ occupancy drops to its lowest level during a time interval $T_I$. Such sudden drop negatively impacts the command latency of the SSD 10, as shown in (610A) of FIG. 3. In other words, FIG. 3 illustrates that the number of completions over the time interval $T_I$ (i.e., (#Compl'n)/$T_I$) and the command latency of the SSD 10 varies too much.

Figure 3:
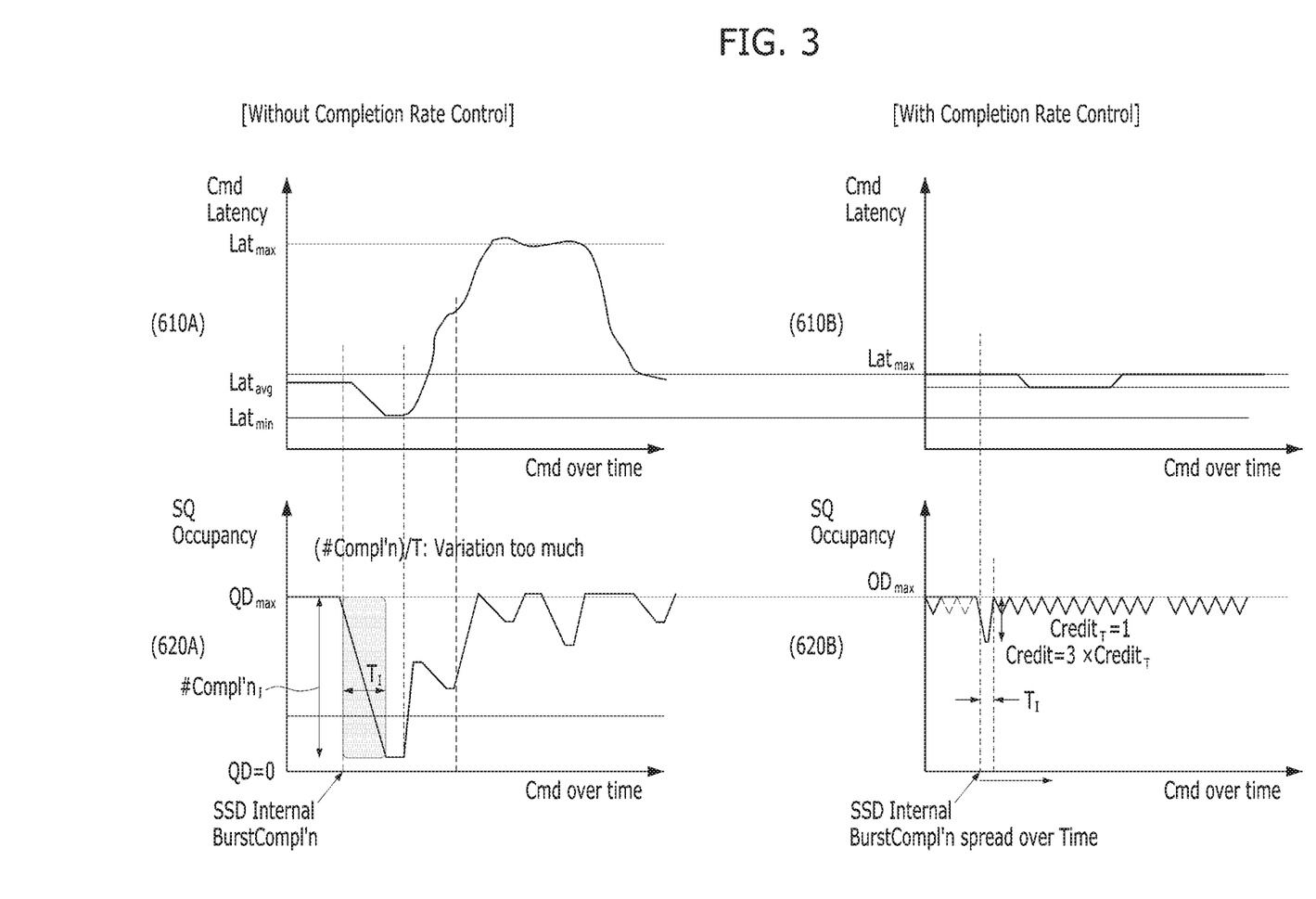
FIG. 3 illustrates impact of command latency and queue occupancy in a memory system with a completion rate control component in accordance with an embodiment of the present invention.

Embodiments provide a scheme capable of making the occupancy level as flat (or spread) as possible by re-distributing bursty completions over time without sacrificing the target throughput, as shown in (620B) of FIG. 3. As a result, embodiments minimize or reduce variation of command latency, as shown in (610B) of FIG. 3.

Referring back to FIG. 1, the completion rate control component 420 may control the rate at which notification is given to the host 5 of completion of bursty operations to be consistent over time. In an illustrated example of FIG. 4, when there are multiple bursty completions associated with the command requests (710), the completion rate control component 420 may spread out over time delivering completion notifications with respect to the multiple bursty operations. By way of example and without any limitation, the completion rate control component 420 spreads out the multiple completion notifications over a plurality of time intervals, e.g., two time intervals $T_I(i)$, $T_I(i+1)$. The number of time intervals over which the notifications are spread may be greater than 2, depending on the number of multiple completions and the target throughput. For this, the completion rate control component 420 may determine a first number of completion notifications, which are to be transmitted in the first time interval $T_I(i)$ and a second number of completion notifications, which are to be transmitted in the second time interval $T_I(i+1)$. Thereafter, the completion rate control component 420 may transmit, to the host 5, the first number of completion notifications in the first time interval $T_I(i)$, and transmit, to the host 5, the second number of completion notifications in the second time interval $T_I(i+1)$ subsequent to the first time interval $T_I(i)$.

Figure 4:
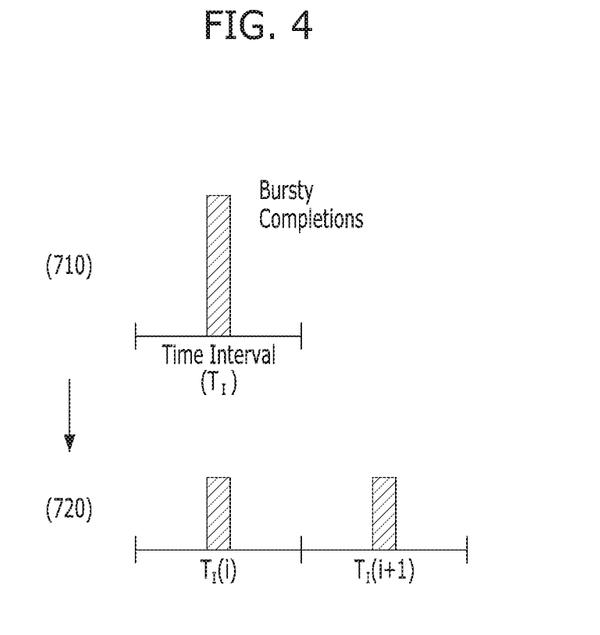
FIG. 4 illustrates an operation of a completion rate control component in accordance with an embodiment of the present invention.

In some embodiments, the completion rate control component 420 may control the rate at which the host 5 is notified of each of the multiple completions based on a throughput credit. The completion rate control component 420 may perform an algorithm to control the number of completion notifications ($Cmpl_T$ in IOs) per predefined time interval ($T_I$, in second), i.e., a credit based rate control (CBRC) algorithm. Eventually, the average transmission rate of the completion notifications (or throughput in IOs per second, or IOPs) should be maintained as $Cmpl_T \times T/T_I$ (IOPs). Similarly, if a fixed $Cmpl_T$ is preferred, $T_I$ can be adjusted to achieve an expected transmission rate.

At each $T_I$, when multiple commands are completed, the completion rate control component 420 may transmit, to the host 5, completion notifications corresponding to a particular credit Credit=$Cmpl_T$=$Credit_T$. $Credit_T$ is dynamically adjusted according to the target throughput over a relatively long time period, i.e., longer than $T_I$. At each $T_I$, if no notification of command completion is provided to the host 5, the completion rate control component 420 may determine a credit to be used at the next time interval as the Equation: Credit=$2 \times Credit_T$.

Referring back to FIG. 2, each command goes through multiple buffering stages in buffers and queues until its executed and queued for notification of its completion. Among the multiple queueing stages, the final stage includes a rate metering queue (RMQ), for which the CBRC algorithm is performed based on the credit $Credit_T$. The CBRC algorithm is similar to a highway ramp metering system used to limit the traffic (or cars) entering the highway to avoid a traffic jam when traffic is heavy. The interval $T_I$ is similar to an interval defined by a green light in that each represents a fixed time duration. The credit $Credit_T$ is the number of completion notifications to be sent to the host in the interval $T_I$. When no notifications are sent to the host during a specific time interval, then the number of notifications that were permitted to be sent during that time period can be credited to the next time interval to compensate for the lack of throughput in the previous time invention and to thereby maintain the overall throughput.

In some embodiments, multiple RMQs may be maintained for different workloads. For example, the multiple RMQs include an RMQ for read commands and an RMQ for write commands. For finer control, the commands in each of the read and write RMQs may be separated into RMQs for random commands and RMQs for sequential commands, or include group RMQs depending on block size. Each RMQ may have its own parameters to achieve different target throughput levels.

Figure 5:
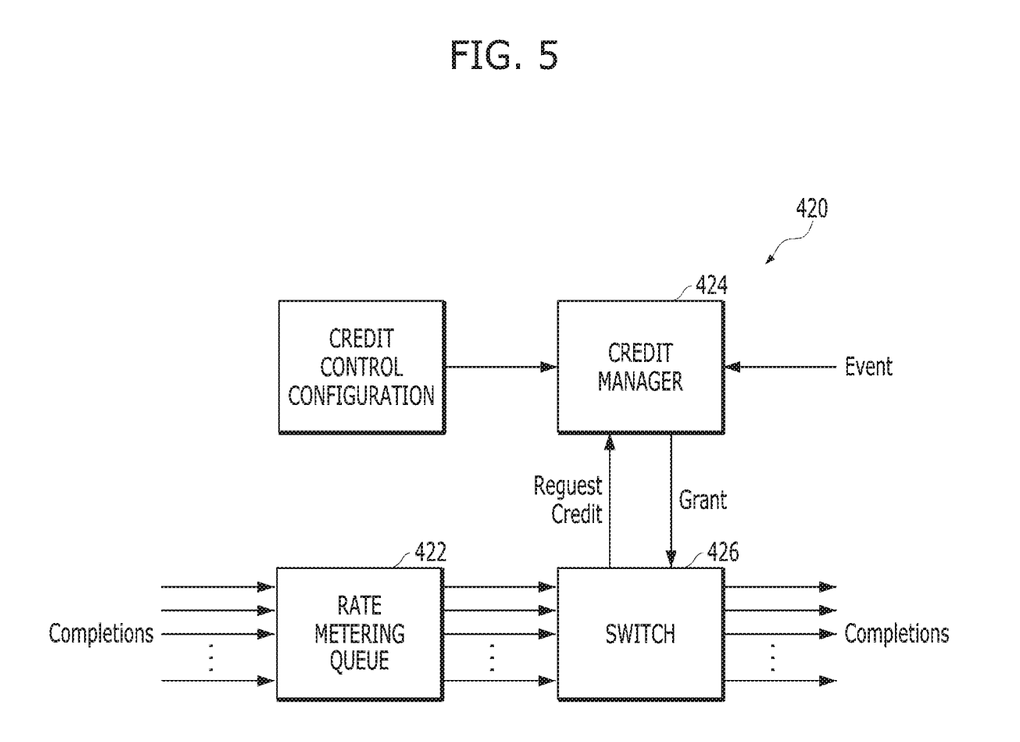
FIG. 5 is a diagram illustrating a completion rate control component in accordance with an embodiment of the present invention.

FIG. 5 is a diagram illustrating the completion rate control component 420 in accordance with an embodiment of the present invention.

Referring to FIG. 5, the completion rate control component 420 may include a rate metering queue (RMQ) 422, a credit manager 424 and a switch 426. Although not shown in FIG. 5, the completion rate control component 420 may include a timer for providing a time interval ($T_I$) for rate control. The rate metering queue 422 may store (or enqueue) multiple completions associated with processed command requests. The switch 426 may send a request of a throughput credit for one or more completions among the multiple completions, to the credit manager 424. When there are enough credits, the credit manager 424 may grant the credit request of the switch 426. Upon receipt of the grant, the switch 426 may transmit, to the host 5, the corresponding completion notifications in the rate metering queue 422.

The credit manager 424 may manage the throughput credits and determine whether to grant a credit request from the switch 426 based on the throughput credit. The throughput credit may be managed based on credit control configuration as set forth in the following lists: List1 to List3.

---
List1:
---

At every $T_I$ // completion interval
   if (#Compl == 0){ // no completion entry in RMQ
      Credit = Credit + $Credit_T$ ; //incremented for next $T_I$
   }else{
      #Compl =min(#Compl entries in RMQ, Credit, $Credit_{max\_T}$ );
      Send #Compl to Host ;
      Credit = Credit − (#cmds Compl) + $Credit_T$;
   }
   Update RMQ_occupancy_average ;

---

Referring to List1, if there is no completion entry in the RMQ 422 at a current time interval, the credit manager 424 determines the throughput credit for next time interval as the sum of the throughput credit for current time interval and a set credit (Credit=Credit+$Credit_T$). If there are completion entries in the RMQ 422 at current time interval, the credit manager 424 determines a first number of completions, which corresponds to the lowest of the current throughput credit (Credit), a set maximum credit ($Credit_{max\_T}$), and the number of completion notifications in the RMQ 422 (#Compl entries in RMQ). Thus, the switch 426 transmits the first number of completions to the host 5 (Send #Compl to Host). Further, the credit manager 424 determines the throughput credit for next time interval by subtracting the number of transmitted completion notifications from the sum of the throughput credit for current time interval and the set credit (Credit=Credit−(#cmds Compl)+Credit$_T$). Moreover, the credit manager 424 updates the average amount of time for which the multiple completion notifications occupy the RMQ 422 (Update RMQ_occupancy_average). In an example as shown in (620B) of FIG. 3, the throughput credit for bursty completions may be determined as (Credit=3× Credit) while the throughput credit for normal completions may be determined as (Credit=1). The operation of List1 may be performed at every time interval $T_I$.

---
List2:
---
At every $T_{AI}$  // Adjustment Interval $T_{AI} \gg T_I$, a lot slower interval
   if RMQ_occupancy_average > RMQ_occupancy_target_upper
      Credit$_T$++ ; //Throughput increase is required.
   if RMQ_occupancy_average < RMQ_occupancy_target_lower
      Credit$_T$ −− ; //Throughput decrease is required.
---

Referring to List2, the credit manager 424 compares an average occupancy time of multiple completion notifications in the RMQ 422 (RMQ_occupancy_average) with a set target upper occupancy time (RMQ_occupancy_target_upper) or a set target lower occupancy time (RMQ_occupancy_target_lower). If the average occupancy time (RMQ_occupancy_average) is greater than the set target upper occupancy time (RMQ_occupancy_target_upper), the credit manager 424 determines that throughput is to be increased to increase the set credit (Credit$_T$++). If the average occupancy time (RMQ_occupancy_average) is greater than the set target lower occupancy time (RMQ_occupancy_target_lower), the credit manager 424 determines that throughput is to be decreased to decrease the set credit (Credit$_T$−−). The operation of List2 may be performed at every adjustment time interval $T_{AI}$ (where $T_{AI}$ is greater than $T_I$).

---
List3:
---
At every throughput_increase_need event // Event based
   Credit$_T$++ ; //Throughput increase is required.
At every throughput_decrease_need event // Event based
   Credit$_T$−− ; //Throughput deccrease is required.
---

Referring to List3, the credit manager 424 determines that throughput is to be increased to increase the set credit (Credit$_T$++) in response to each event indicating the need to increase throughput. The credit manager 424 determines that throughput is to be decreased to decrease the set credit (Credit$_T$−−) in response to each event indicating the need to decrease throughput.

Figure 6:
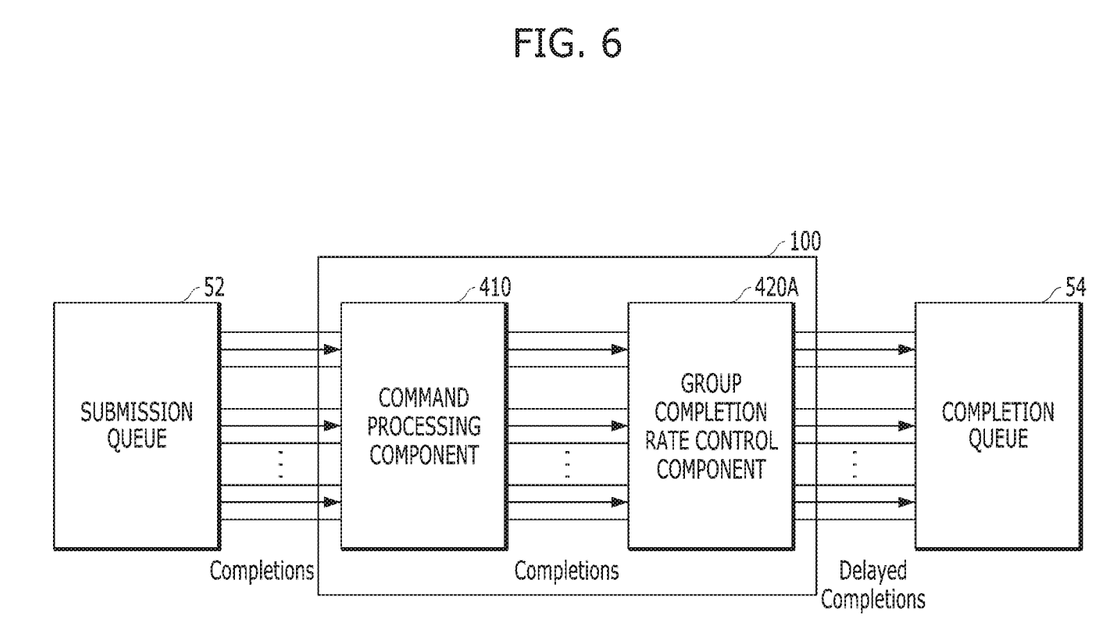
FIG. 6 is a diagram illustrating a controller including a group completion rate control component in accordance with an embodiment of the present invention.

FIG. 6 is a diagram illustrating a controller 100 including a group completion rate control component 420A in accordance with an embodiment of the present invention. The group completion rate control component 420A replaces the completion rate control component 420 of FIG. 1.

Referring to FIG. 6, the group completion rate control component 420A may include a plurality of completion rate control components. Each completion rate control component may provide corresponding latency (or throughput) characteristic and thus the group completion rate control component 420A may provide different latency characteristics. In other words, each completion rate control component may provide the completion queue of the host 5 with delayed completion notifications according to the latency characteristic of the corresponding completion rate control component.

Figure 7:
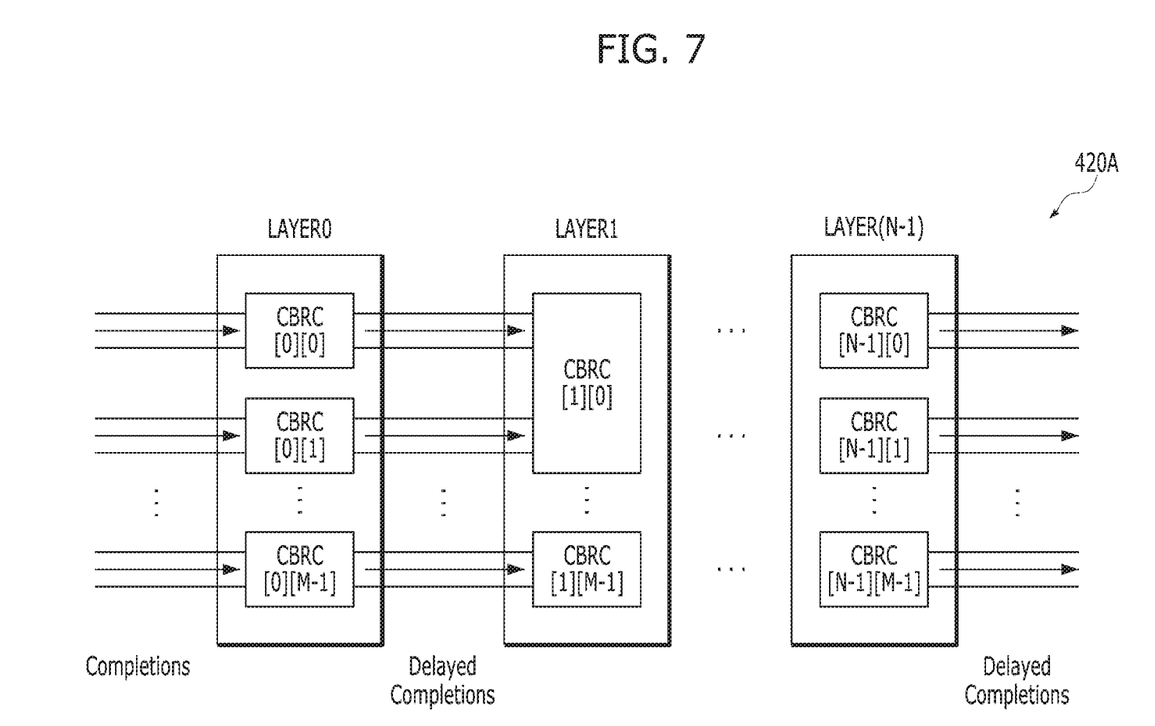
FIG. 7 is a diagram illustrating a group completion rate control component in accordance with an embodiment of the present invention.

FIG. 7 is a diagram illustrating the group completion rate control component 420A in accordance with an embodiment of the present invention.

Referring to FIG. 7, the group completion rate control component 420A may be implemented with a plurality of completion rate control components (e.g., CBRC components), which are concatenated in multiple layers, e.g., N layers LAYER0 to LAYER(N−1). Each layer may include M CBRC components. In the illustrated example, two CBRC components (CBRC[0][0], CBRC[0][1]) in a first layer LAYER0 are shared by a CBRC component (CBRC[1][0]) in a second layer LAYER1. Each CBRC component may receive completion notifications and process them based on a corresponding throughput credit to output delayed completion notifications.

Figure 8:
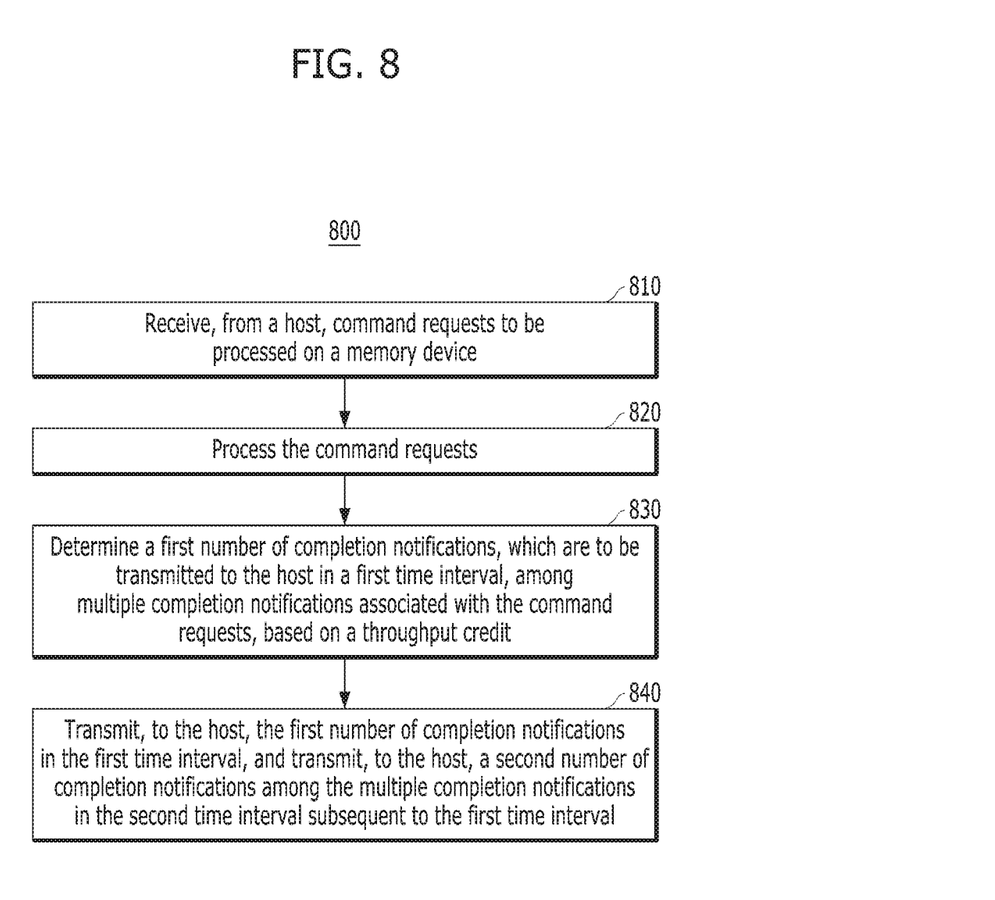
FIG. 8 is a flowchart illustrating a command processing operation in accordance with an embodiment of the present invention.

FIG. 8 is a flowchart illustrating a command processing operation 800 in accordance with an embodiment of the present invention. The command processing operation 800 may be performed by components 410 and 420 of the controller 100 in FIG. 1.

Referring to FIG. 8, at step 810, the controller 100 may receive, from a host, command requests to be processed on a memory device. At step 820, the controller 100 may process the command requests.

At step 830, the controller 100 may determine a first number of completion notifications, which are to be transmitted in a first time interval, among multiple completion notifications associated with the command requests, based on a throughput credit. In some embodiments, the first number of completion notifications are determined to be a lowest value among the throughput credit, a set maximum credit, and the number of multiple completion notifications.

In some embodiments, the throughput credit is adjusted by a set credit amount based on the processing of the command requests, the transmitting of the first number of completion notifications and the second number of completion notifications. For example, the throughput credit is increased by the set credit amount in response to the processing of the command requests. For another example, the throughput credit is decreased by the set credit amount in response to the transmitting of each of the first number of completion notifications and the second number of completion notifications.

In some embodiments, the set credit is adjusted based on an average occupancy time of the multiple completion notifications. For example, the set credit is increased when the average occupancy time is greater than a set target upper occupancy. For another example, the set credit is decreased when the average occupancy time is less than a set target lower occupancy.

In some embodiments, the set credit is increased in response to a throughput increase event and the set credit is decreased in response to a throughput decrease event.

At step 840, the controller 100 may transmit, to the host, the first number of completion notifications in the first time interval, and transmit, to the host, a second number of completion notifications in the second time interval subsequent to the first time interval.

As described above, embodiments provide a scheme for controlling a completion notification rate of commands over time based on a throughput credit and thus provide consistent performance metrics (i.e., throughput or latency).

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A data processing system comprising:
a host; and
a memory system including a controller and a memory device, the controller suitable for:
receiving, from the host, command requests to be processed on the memory device;
processing the command requests;
determining a first number of completion notifications, which are to be transmitted to the host in a first time interval, among multiple completion notifications associated with the command requests, based on a throughput credit and a number of the multiple completion notifications; and
transmitting, to the host, the first number of completion notifications in the first time interval, and transmitting, to the host, a second number of completion notifications among the multiple completion notifications in the second time interval subsequent to the first time interval,
wherein the first number of completion notifications transmitted in the first time interval and the second number of completion notifications transmitted in the second time interval comprise a target throughput for the memory controlled by the throughput credit.

2. The data processing system of claim 1, wherein the controller determines the first number of completion notifications, the first number corresponding to at least one of a lowest value among the throughput credit, a set maximum credit, and the number of the multiple completion notifications.

3. The data processing system of claim 2, wherein the throughput credit is adjusted by a set credit amount, based on one of the processing of the command requests and the transmitting of the first number of completion notifications and the second number of completion notifications.

4. The data processing system of claim 3, wherein the throughput credit is increased by the set credit amount in response to the processing of the command requests.

5. The data processing system of claim 3, wherein the throughput credit is decreased by the set credit amount in response to the transmitting of each of the first number of completion notifications and the second number of completion notifications.

6. The data processing system of claim 3, wherein the set credit amount is adjusted, based on an average occupancy time in a queue for the multiple completion notifications.

7. The data processing system of claim 6, wherein the set credit amount is increased when the average occupancy time is greater than a set target upper occupancy.

8. The data processing system of claim 6, wherein the set credit amount is decreased when the average occupancy time is less than a set target lower occupancy.

9. The data processing system of claim 3, wherein the set credit amount is increased in response to a throughput increase event.

10. The data processing system of claim 3, wherein the set credit amount is decreased in response to a throughput decrease event.

11. A method for operating a data processing system, which includes a host and a memory system including a controller and a memory device, the method comprising:
receiving, from the host, command requests to be processed on the memory device;
processing the command requests;
determining a first number of completion notifications, which are to be transmitted to the host in a first time interval, among multiple completion notifications associated with the command requests, based on a throughput credit and a number of the multiple completion notifications; and
transmitting, to the host, the first number of completion notifications in the first time interval, and transmitting, to the host, a second number of completion notifications among the multiple completion notifications in the second time interval subsequent to the first time interval,
wherein the first number of completion notifications transmitted in the first time interval and the second number of completion notifications transmitted in the second time interval comprise a target throughput for the memory controlled by the throughput credit.

12. The method of claim 11, wherein the determining of the first number of completion notifications comprises determining the first number of completion notifications, the first number corresponding to at least one of a lowest value among the throughput credit, a set maximum credit, and the number of the multiple completion notifications.

13. The method of claim 12, wherein the throughput credit is adjusted by a set credit amount, based on one of the processing of the command requests and the transmitting of the first number of completion notifications and the second number of completion notifications.

14. The method of claim 13, wherein the throughput credit is increased by the set credit amount in response to the processing of the command requests.

15. The method of claim 13, wherein the throughput credit is decreased by the set credit amount in response to the transmitting of each of the first number of completion notifications and the second number of completion notifications.

16. The method of claim 13, wherein the set credit amount is adjusted, based on an average occupancy time in a queue for the multiple completion notifications.

17. The method of claim 16, wherein the set credit amount is increased when the average occupancy time is greater than a set target upper occupancy.

18. The method of claim 16, wherein the set credit amount is decreased when the average occupancy time is less than a set target lower occupancy.

19. The method of claim 13, wherein the set credit amount is increased in response to a throughput increase event.

20. The method of claim 13, wherein the set credit amount is decreased in response to a throughput decrease event.

* * * * *